United States Patent
Eckardt et al.

(10) Patent No.: US 10,304,573 B2
(45) Date of Patent: May 28, 2019

(54) METHOD FOR THE PRESSURE RELIEF OF A NUCLEAR POWER PLANT, PRESSURE-RELIEF SYSTEM FOR A NUCLEAR POWER PLANT AND ASSOCIATED NUCLEAR POWER PLANT

(75) Inventors: Bernd Eckardt, Bruchköbel (DE); Norbert Losch, Offenbach (DE); Carsten Pasler, Rodgau (DE)

(73) Assignee: Framatome GmbH, Erlangen (DE)

( * ) Notice: Subject to any disclaimer, the term of this patent is extended or adjusted under 35 U.S.C. 154(b) by 2355 days.

(21) Appl. No.: 13/217,323

(22) Filed: Aug. 25, 2011

(65) Prior Publication Data
US 2012/0051488 A1    Mar. 1, 2012

(30) Foreign Application Priority Data

Aug. 25, 2010  (DE) .................. 10 2010 035 510

(51) Int. Cl.
*G21C 9/00* (2006.01)
*B01D 53/04* (2006.01)
(Continued)

(52) U.S. Cl.
CPC ............. *G21C 9/001* (2013.01); *B01D 53/04* (2013.01); *B01D 53/0438* (2013.01);
(Continued)

(58) Field of Classification Search
None
See application file for complete search history.

(56) References Cited

U.S. PATENT DOCUMENTS 3,964,887 A   6/1976  Hickey et al.
4,913,850 A   4/1990  Puppe et al.
(Continued)

FOREIGN PATENT DOCUMENTS

DE   3815850 A1   11/1989
DE   3824606 A1    1/1990
(Continued)

OTHER PUBLICATIONS

WO 9016071 (machine translation generated at espacenet Dec. 3, 2014).*
(Continued)

*Primary Examiner* — Jack W Keith
(74) *Attorney, Agent, or Firm* — Laurence A. Greenberg; Werner H. Stemer; Ralph E. Locher

(57) ABSTRACT

A method and a corresponding device for the pressure relief of a nuclear power plant having an outlet for a relief flow. The relief flow is guided out of a containment into the atmosphere via a relief line provided with a filter system. The filter system has a filter chamber with a filter-chamber inlet and outlet and a sorbent filter arranged therebetween. The relief flow is guided in a high-pressure section of the relief line past the filter chamber, with the latter being heated, and the relief flow is expanded at the end of the high-pressure section and dried. In order for efficient retention of iodine-containing organic compounds, the relief flow is guided through a bed filter, guided in a superheating section past the high-pressure section of the relief line and in the process is heated, guided in this state directly thereafter through the filter chamber having the sorbent filter.

13 Claims, 5 Drawing Sheets

(51) Int. Cl.
  *G21C 9/004* (2006.01)
  *G21F 7/015* (2006.01)
  *G21F 9/02* (2006.01)
  *B01D 53/26* (2006.01)

(52) U.S. Cl.
  CPC ............ *G21C 9/004* (2013.01); *G21F 7/015* (2013.01); *G21F 9/02* (2013.01); *B01D 53/265* (2013.01); *B01D 2253/108* (2013.01); *B01D 2257/2068* (2013.01); *Y02E 30/40* (2013.01)

(56) References Cited

U.S. PATENT DOCUMENTS

| | | | | |
|---|---|---|---|---|
| 5,227,127 | A | * | 7/1993 | Sato .............................. 376/313 |
| 8,218,709 | B2 | | 7/2012 | Eckardt |
| 2006/0188055 | A1 | * | 8/2006 | Eckardt ........................ 376/283 |

FOREIGN PATENT DOCUMENTS

| | | |
|---|---|---|
| DE | 39 01 784 A1 | 7/1990 |
| WO | 90/16071 A1 | 12/1990 |
| WO | 9835744 A1 | 8/1998 |
| WO | 2004114322 A2 | 12/2004 |

OTHER PUBLICATIONS

KTA 3605 (Nov. 2012), "Treatment of Radioactively Contaminated Gases in Nuclear Power Plants with Water Reactors" Safety Standards of the Nuclear Safety Commission (KTA).

KTA 3601 (Nov. 2005), "Ventilation Systems in Nuclear Power Plants", Safety Standards of the Nuclear Safety Standards Comission (KTA).

* cited by examiner

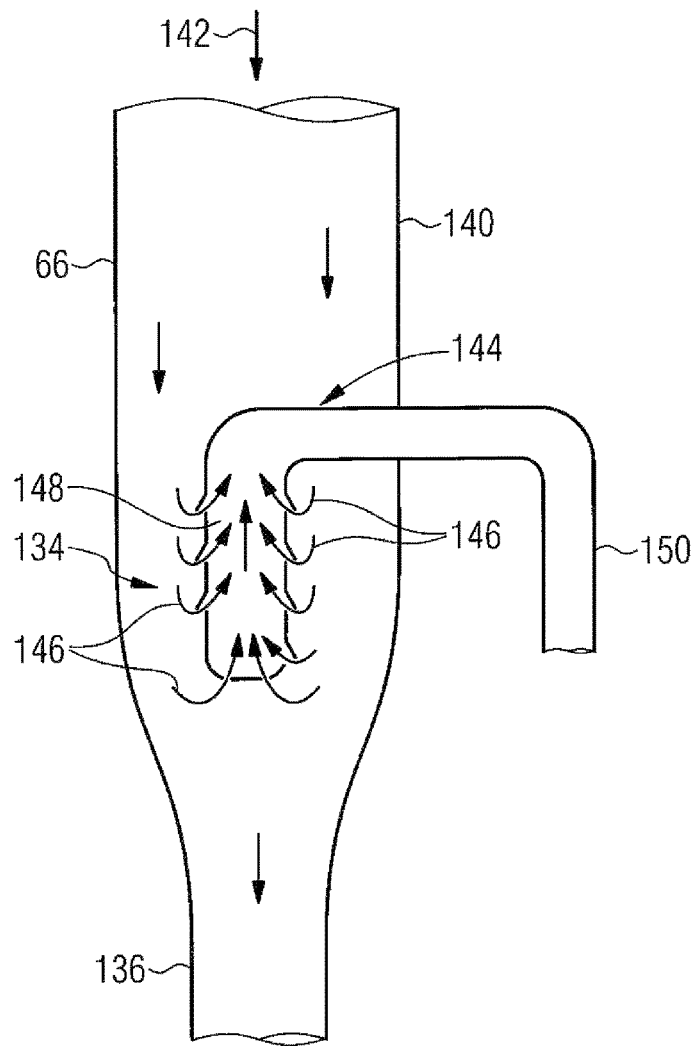

METHOD FOR THE PRESSURE RELIEF OF A NUCLEAR POWER PLANT, PRESSURE-RELIEF SYSTEM FOR A NUCLEAR POWER PLANT AND ASSOCIATED NUCLEAR POWER PLANT

CROSS-REFERENCE TO RELATED APPLICATION

This application claims the priority, under 35 U.S.C. § 119, of German application DE 10 2010 035 510.0-54, filed Aug. 25, 2010; the prior application is herewith incorporated by reference in its entirety.

BACKGROUND OF THE INVENTION

Field of the Invention

The invention relates to a method for the pressure relief of a nuclear power plant containing a containment for enclosing activity carriers and containing an outlet for a relief flow. The relief flow is guided out of the containment into the atmosphere via a relief line provided with a filter system. The filter system has a filter chamber with a filter-chamber inlet, a filter-chamber outlet and a sorbent filter arranged therebetween. The relief flow is guided in a high-pressure section of the relief line at least partially past the filter chamber, with the latter being heated in the process by way of heat transfer, and the relief flow is expanded at the end of the high-pressure section at a throttle and dried.

The invention furthermore relates to a corresponding pressure-relief system for a nuclear power plant containing a containment for enclosing activity carriers and having an outlet for a relief flow. A relief line, which is provided with a filter system, is connected to the outlet. The filter system has a filter chamber with a filter-chamber inlet, a filter-chamber outlet and a sorbent filter arranged therebetween. The relief line contains a high-pressure section which is guided past the filter chamber at least in a partial section and is in thermal interaction with the filter chamber via heat-exchanger surfaces, and wherein a throttle is connected into the relief line at the end of the high-pressure section.

The invention finally relates to a nuclear power plant comprising such a pressure-relief system.

For retention of active gases or steam, which form in accident situations, in particular in the unlikely event of core meltdown, nuclear power plants are usually surrounded by a comparatively solid containment made of concrete, reinforced concrete or steel, which forms a hermetic seal with respect to the environment. Such containments are typically configured to withstand even high internal pressures, for example as can occur in the case of an oxyhydrogen explosion or in the case of massive discharge of coolant steam from the coolant circuit.

Studies of containment behavior under high accident induced pressures have shown, however, that comparatively strongly contaminated atmosphere can be correspondingly discharged into the environment owing to leaks which form in the containment. In order to minimize such unfiltered leaks, it is very advantageous if the pressure can be significantly relieved down to slight positive pressure or even to ambient pressure. This is highly important in particular for containments for which the likelihood of crack formation owing to the construction, such as for example concrete containments or in sensitive seal regions such as airlocks etc., increases under such high pressure conditions.

Therefore, various systems for positive pressure limitation and (filtered) pressure relief of the containment in accident situations have already been installed in numerous nuclear power plants. Such devices enable the retention of the aerosols containing elemental iodine. Effective retention of organoiodine from this relief flow—in passive operation without external energy supply—has so far not been possible. Recent findings from accident research have shown, however, that in such events especially the emitted organoiodine component can contribute significantly to the radioactive contamination of the population and is thus a risk factor. Within the framework of this application, organoiodine is in particular iodine in the form of organic compounds of relatively low carbon number, such as methyl iodide etc.

By way of example, in the method according to the international patent application WO 90/16071, mentioned in the introduction, and the associated piece of apparatus, a relief flow, which is under comparatively high pressure and flows out of the containment through a relief line, is guided after its expansion and expansion drying through a throttle valve, also referred to as throttle, through a filter chamber having a sorbent filter. Such sorbent filters are also referred to as molecular sieves or mole sieves in short, and retain by way of sorption the elemental iodine in the relief flow comparatively well if the operating conditions are chosen such that there is no condensing out of the relief flow in the molecular sieve. During wet operation, however, the sensitive filter surfaces may be destroyed or become irreversibly "blocked".

In order to avoid this, according to international patent application WO 90/16071 a sufficiently high operating temperature of the iodine sorbent filter, in particular with silver nitrate coating, is ensured by way of the comparatively warm relief flow in the high-pressure section of the relief line, that is to say upstream of the throttle, being guided past the filter chamber (or else through heating pipes through individual filter elements) and pre-heating the latter by way of heat transfer. The device can be combined with a coarse and fine filter means connected upstream, a metal fiber sieve for dehumidifying gas, and additionally with a freely discharging Venturi scrubber. The dew point difference of the relief flow in the low-pressure section is substantially determined by the (theoretical) throttle temperature and is here only about 5° C. on account of the construction. The retention of organoiodine is, as already mentioned above, not satisfactory according to recent investigations, or at least not at economically acceptable operation without the use of external energy.

Furthermore, significant amounts of heating occur especially in shutdown phases (no through-flow) because of the decay of the stored activity carriers. This can result in relevant heating of the molecular sieve, wherein the microcrystals are already destroyed at an operating temperature of about 210° C. owing to melting of the silver nitrate coating, and thus the separation action is lost and the activity carriers are released.

The process of pressure reduction in the containment by way of (filtered) discharge of pressurized gas or steam into the atmosphere is also referred to as venting. Accordingly, the relief flow is also referred to as venting gas flow or similar.

In terms of design and the possible activity emission, the plants operated nowadays differ significantly from the new third-generation reactors (GEN 3), because in the latter case core melting was already taken into account in the design. Devices, such as scrubbers or sand-bed filter combinations, which have already been retrofitted, do not solve the new problem of organoiodine retention to be addressed or the desired substantial pressure relief per se, in particular because of the high driving pressures required in scrubbers and the small reaction surface areas for mass transfer in the liquid phase and the very low separation efficiency for iodine in sand beds or molecular sieves in wet operation. Improvement of these devices, including in already existing plants, is of essential importance in order to achieve the higher safety standards of these nuclear power plants.

A quantitative separation of all air-borne aerosol and iodine activities would also permit a significant reduction in costs in GEN3 plants, since the noble-gas activities which cannot be retained decay within a matter of days and thus a medium-term pressure relief—without relevant release—becomes possible. This permits a simplified design of the containment and of the associated safety systems and, consequently, significant cost reductions.

SUMMARY OF THE INVENTION

It is accordingly an object of the invention to provide method for the pressure relief of a nuclear power plant, a pressure-relief system for a nuclear power plant and an associated nuclear power plant which overcome the above-mentioned disadvantages of the prior art methods and devices of this general type, which is intended for particularly efficient and effective retention of activity carriers contained in the relief flow, in particular of iodine-containing organic compounds. Also specified here will be a pressure-relief system for a nuclear power plant which is particularly suitable for carrying out the method.

With respect to the method, the object is achieved in that the relief flow is guided in a low-pressure section downstream of the throttle through a sand-bed or gravel-bed filter. The relief flow is subsequently guided in a superheating section past the high-pressure section of the relief line and in the process is heated by way of heat transfer. The relief flow is subsequently guided in this state directly thereafter through the filter chamber having the sorbent filter and is finally discharged into the atmosphere.

Surprisingly it has been found that the strong activity of a gas flow during pressure relief of a containment can be retained highly effectively by way of particularly effective passive-regenerative gas superheating downstream of the throttle by heat transfer from the positive-pressure region into the atmospheric region and subsequent sorbent filtering.

The throttle, which is also referred to as throttle valve or expansion valve, brings about a first drying of the relief flow by way of expansion, wherein it is also possible for the temperature to be significantly lower than the theoretical throttle temperature on account of still contained gas humidity and non-ideal throttling, depending on the operating phase. Downstream of the throttle, fine-solid filtering using a solids filter, such as a sand-bed filter or a gravel-bed filter, takes place. In the superheating section which is connected downstream thereof, the crucial superheating of the relief flow takes place—largely independently of the effectivity of the expansion drying—, which reliably prevents condensing in the region of the moisture-sensitive iodine-sorbent filter even under unfavorable operating conditions. Owing to the previous filtering in the sand-bed or gravel-bed filter, effective heat transfer to the partially cleaned relief flow on the corresponding heat-exchanger surfaces of the superheating section is ensured. Owing to the effective utilization of the surplus of heat present in the high-pressure region of the relief line for pre-heating the filter chamber and also for directly heating the relaxed relief flow directly before it enters the filter chamber, no external energy, such as in the form of electrical heating devices, needs to be used according to the principle of regenerative heat recovery with intrinsic-medium heating. This makes the method not only highly effective but also particularly energy-efficient.

Advantageously, the relief flow is heated in the superheating section to a temperature which is—in the assumed case of design-basis accident events—at least 10° C., preferably 20° C. to 50° C., above the dew-point temperature present there. The dew point or dew-point temperature is that temperature at which, in the relief flow, an equilibrium of condensing and evaporating water is established, in other words condensate formation is just starting. As has surprisingly been shown, the degree of separation for organoiodine, in particular if non-water-soluble silver coatings are used, increases drastically and typically achieves, for example in such sorbent materials on zeolite basis, values of up to 99.99% if the dew point difference is >10° C., preferably >20° C., even in the case of a relief flow with a high steam content that has been only partially cleaned by the sand-bed filter.

In a highly effective molecular sieve with (water-soluble) silver nitrate coating, even minor superheating by for example 5° C. above the dew point would under certain circumstances suffice for effectively retaining organoiodine with high retention rates. However, it has been shown that such a process in the facilities known from the prior art depends strongly on largely achieving the theoretical throttle temperature and on avoiding any residual humidity in the gas that severely minimizes superheating. In consideration of these new findings, such a plant of conventional structural configuration, as is known, for example, from international patent disclosure WO 90/16071 mentioned in the introduction, with its immanent minor superheating, cannot be operated effectively and safely. Only the concept according to the invention provides an effective solution.

Preferably, the stated superheating by at least 20° C., especially preferably at least 50° C., above the dew-point temperature is achieved at full-load operation of the pressure-relief system. This refers to the initial relief operation after a design-basis accident, when the pressure inside the containment is at a maximum and is typically about 3 to 8 bar, depending on the type of reactor and containment. Here, venting gas mass flows of typically about 3 to 10 kg/s are reached. The dew-point temperature in the region of the sorbent filter is in that case, depending on steam content, typically about 80 to 100° C., with the result that the temperature of the venting gas is, after superheating, preferably about 100 to 170° C. when it enters the sorbent filter. During partial-load operation, when the venting gas mass flows are about 25% of the corresponding values in full-load operation, the temperature increase is preferably still at least 10° C.

Here, particularly effective and compact iodine sorption filtering with transient superheating and inverse residence times (short residence time at high superheating and long residence time at slight superheating) to virtually atmospheric pressure can be achieved, without auxiliary energy. Here, in the case of high containment pressure, a high volume flow is produced after throttling, and despite the resulting low sorption filter residence times, optimum reaction conditions with simultaneously increased diffusion are achieved due to the now high gas superheating at the sorbent. If the containment pressure is low, for example a quarter of the initial maximum pressure of e.g. 5 bar absolute, a low volume flow with reduced gas superheating is produced after throttling to nearly atmospheric pressure, but despite unfavorable sorption conditions, effective iodine sorption is likewise possible owing to the sorption filter residence time which is now (nearly four times) higher. Effective sorption filtering is thus possible also until complete pressure relief is achieved and at containment temperatures of only 50° C. to 100° C., owing to the now still increasing sorption filter residence time.

Especially at low containment pressure, for example less than 1 bar positive pressure with respect to the atmosphere, in each case partial condensation/dehumidification and thus dew-point lowering in the relief gas flow can take place effectively by way of a cooling/drying operation connected between the throttle and the superheating section, owing to the corresponding transfer of heat to the environment, for example by sand-bed filters, pipelines, dryer/coolers by way of ambient air. As a result, the necessary superheating is always passively regulated with a correspondingly low temperature level in the regenerative heat exchanger (superheating section), and optimum iodine retention in the sorbent is made possible, even at reduced containment temperatures.

The regenerative heat exchanger that forms the superheating section and the filter chamber having the sorbent filter are arranged for good heat transfer preferably in the immediate vicinity at distances of <5 m, or are expediently integrated in a component. Here, the combination can be arranged in different chambers inside a pressure vessel in order to minimize heat losses and outlay and in order to ensure optimum superheating and reaction conditions.

The sorbent filter is preferably arranged in an annular chamber surrounding the central chamber, having already integrated gas heating by way of the heat-exchanger tubes. The annular chamber has, for example, perforated tube sheet-metal sieves with the sorbent. A fiber filter for retention of abraded sorbent particles can be connected downstream of the sorbent filter. Alternatively, a largely pressureless flat filter-chamber construction with interconnected regenerative heat-exchanger elements can be provided. In this case, modular configuration by way of connecting a number of modules is possible. The sorption unit is heated here directly before the flow passes through it; in an expedient case, the filter chambers are still partially heated externally using a medium.

In a particularly advantageous embodiment, the relief flow in the high-pressure section is guided at least partially through a central chamber which is surrounded by the filter chamber or adjoins it, wherein the relief flow in the superheating section is guided through heat-exchanger elements, in particular heat-exchanger tubes, which are arranged at least partially in the central chamber. That means that the hot relief flow (or possibly even only a partial flow thereof), which is still pressurized upstream of the throttle, transfers a substantial part of its heat both to the outside to the surrounding filter chamber for pre-heating the sorbent filter elements and to the already relaxed relief flow that is guided in the heat-exchanger tubes, and directly after the thus effected superheating, the relief flow is guided into the filter chamber having the sorbent filter and is filtered there in the superheated state.

In terms of apparatus, that means that the filter chamber expediently surrounds a central chamber, which is provided for guiding through the relief flow in the high-pressure section, or adjoins it, wherein the relief line in the region of the superheating section has a number of heat-exchanger elements which are arranged in the central chamber or project into it.

For particularly effective heat transfer, the heat-exchanger elements are preferably in the form of heat-exchanger tubes and are expediently provided with fins or protrusions which are arranged on the outsides of the heat-exchanger tubes at regular intervals, are circumferential or extend in the longitudinal direction.

Advantageously, the relief flow in the superheating section is guided in counterflow or cross-counterflow with respect to the relief flow in the high-pressure section. In terms of apparatus, this means that, for example, the heat-exchanger tubes, which form the superheating section, are arranged with a corresponding orientation, for example as substantially vertical tubes or zigzag-shaped tubes, in the central chamber or project into it.

In another advantageous embodiment, the central chamber has a central-chamber inlet, through which the relief flow in the high-pressure section is guided into the central chamber, and wherein connected to a condensate collection tank, which is connected to the central chamber, is a condensate return line, whose other end is connected to a condensate spray device, in particular a nozzle, in the region of the central-chamber inlet. Here, condensate which forms in the central chamber is collected in the condensate collection tank and at least partially returned to the central-chamber inlet and injected as a fine spray of water or mist of water.

This embodiment is based on the basic idea that the heat-exchanger efficiency in the case of the presence of relevant amounts of soluble and/or non-soluble aerosols in the relief flow could in principle be reduced in an undesired manner. In order to prevent this and instead achieve an effective heat exchange, even in the only partially cleaned raw gas, the abovementioned returning of the condensate and the injection of condensate in the form of a fine spray of water or mist of water already ensures, in terms of operation, permanent heating-surface cleaning of the heat-exchanger elements and thus the necessary efficiency of the regenerative gas superheating.

The pressure-relief system is thus preferably operated in a targeted manner in which an appreciable condensate presence in the convection part surrounding the heat-exchanger elements occurs, in particular at comparatively high gas speeds of the relief flow in the high-pressure section. By way of passive wetting and additional flushing of the heating or exchange surfaces on the pressure-gas side with the partially returned condensate, the desired cleaning effect is achieved in combination with the increased gas speeds.

Here, owing to targeted constriction of gas in the positive-pressure inflow region, that is to say owing to a narrowing of the cross section in the corresponding section of the relief line, the present condensate can be sucked in from the return line or the collection tank and, by way of being injected into the inflowing gas flow, the latter can be brought to saturation-steam conditions and expediently be enriched with additional water droplets. As a result, the superheating zone in the heat exchanger is minimized and as a result of further condensate any deposit of the soluble aerosols is quantitatively prevented, and any deposit of the non-soluble aerosols is prevented to a considerable degree.

In cases where the presence of aerosols is particularly high, a short-term high-pressure water injection can also be brought about by a compressed-air reservoir acting passively and cyclically on a water reservoir, and thus effective heating-surface cleaning on the heat-exchanger elements can be effected.

Another advantageous embodiment which can be combined with the above-described condensate spraying, but can also be used on its own, is based on the basic idea of reducing to a considerable extent the aerosol concentration of the relief flow even before it enters the heat exchanger and thus of counteracting any reduction in effectivity of the heat exchange as a result of aerosol deposits on the heat-exchanger surfaces right from the outset.

In this case, the partial gas flow which is intended for heating is removed in a targeted manner in the high-pressure section of the main gas flow at increased flow speeds in the pipeline of, for example, >50 m/s. This removal takes place in a targeted manner counter to the flow direction of the main gas flow, again at high gas speeds of, for example, >50 m/s, such that a significant amount of inertia separation, on account of inertial and centrifugal forces acting on the gas-born particles, is achieved owing to the spontaneously forced flow reversal and thus effective separation of the quantity-relevant larger particles from the removal flow is effected. For reducing the jet thickness and increasing efficiency, removal by suction can in this case also take place by way of elements with low dimension, for example using pipelines with perforated or slit inlets. Overall, this crucially reduces the air-born aerosol masses of relatively large dimension in the heating gas flow and thus possible deposits in the heat-exchanger region, and a high degree of operational reliability of the regenerative heat exchanger, also in the raw-gas region, is made possible.

By configuring the heating surfaces as dirt-repellent, even surfaces, with blast-resistant coatings or smooth stainless-steel surfaces, or additionally treated, such as polished, electropolished, and integrating condensate distribution systems in the heat-exchanger region, such as tray or channel systems and/or spray systems, effective heat transfer is effectively promoted on a sustained basis.

Advantageously, the flow speed of the relief flow in the high-pressure section is set within a range of 10 m/s to 50 m/s. The flow speed of the relief flow in the superheating section is preferably set within a range of 10 m/s to 70 m/s. The free flow cross section of the throttle is expediently set such that the pressure in the high-pressure section is twice to five times as high as the pressure in the superheating section.

As already mentioned above, the aerosol-containing venting gas in the high-pressure section is advantageously guided around the heat-exchanger tubes which are expediently arranged in a channel-type structure (central chamber) for generating high gas speeds, in particular >10 m/s. Heat-transfer elements (fins) on the raw-gas side are preferably configured to have a mutual spacing of >1 mm, particularly preferably >5 mm, and a predominantly vertical orientation. By selecting an appropriately overdimensioned exchange surface on the aerosol gas side, with an additional heating-surface reserve of >100%, particularly robust and operationally reliable are >500% (based on the value without fouling), reliable operation can be ensured. In addition, partial filtering of aerosols and iodine can continue to take place in the heat-exchanger unit in a targeted manner.

Guiding the aerosol-containing gases through the heat-exchanger tubes is made possible in an embodiment as a plain-tube heat exchanger and at particularly high flow speeds, from for example >10 m/s to 50 m/s, such that relevant deposits in the tubes can be prevented. On the filtered, atmospheric side, with maximum throughput phases, likewise very high gas speeds of >10 m/s up to 70 m/s are set, such that high heat-transfer values are achieved and very compact components become possible.

A high-speed regenerative heat recovery can be realized preferably in an embodiment of the heat exchanger according to the counterflow or cross-counterflow principle as fin-tube or plate heat exchanger. In order to achieve effective heat transfer in cases of low throughput, corresponding internals or structured tube surfaces (fins etc.) are preferably provided in/on the tubes for generating turbulent and/or swirling flow conditions. It is possible in this case to achieve a heat recovery efficiency of >0.5 with high containment pressure and throughput, which can subsequently be increased to up to 0.8 at low containment pressure and low throughput, with very compact units.

By injecting or charging sodium hydroxide (NaOH) and/or sodium thiosulfate ($Na_2S_2O_3$) and/or calcium peroxide ($CaO_2$) into the condensate, for example in the region of the condensate collection tank, additionally a relevant increase of iodine separation can take place already in the high-pressure section of the regenerative heat exchanger. Furthermore, filtering and retention of chlorine-containing gases can be supported in this manner. Alternatively or additionally, such reagents can be injected or embedded in the relief flow in solid or liquid form also in the region of the sand-bed or gravel-bed filter.

By providing additional heating, it is possible, also in later accident phases, to minimize the additional energy requirement particularly effectively in conjunction with the regenerative heat exchanger.

As already explained further above, the relief flow (the venting gas) passes, after the throttling and before entering the superheating section of the regenerative heat exchanger, through a sand-bed or gravel-bed filter at lower temperatures in the expansion-dried state. This device is preferably operated in superheated operation, in particular at high throughput, in order to prevent condensation discharge. The sand-bed filter is furthermore configured such (e.g. thermally insulated) that, at high throughput through the throttle that is connected upstream, it is still possible, taking into consideration the process-heat losses, for dry operation to be achieved, and that partial condensation and dew-point lowering/drying in the gas takes place preferably in partial-load operation.

The sand-bed filter contains, in the inflow region, sand of greater dimensions, for example having an average grain diameter in a range of 0.5 to 2 mm (to prevent blocking), with a filter-layer thickness of preferably 0.5 to 1 m. In the direction of flow, this is followed by a finer filter sand of 0.8 to 0.3 mm grain size. As stated, operation is predominantly effected as dry operation. With the sand-bed filter being appropriately configured with effective, downstream condensate separator, for example in the form of a fiber separator or impingement separator, it is alternatively possible at high throughputs for a wet operation to be predominantly effected in order to achieve a further relevant increase of aerosol separation at the filter medium.

In a particularly preferred embodiment of the pressure-relief system, a prefilter (dry prefilter) is provided, in particular inside the containment, but possibly also outside the containment, for aerosol coarse filtering of the relief flow. Advantageously, a bypass line, which can be closed using an adjustable valve, is connected parallel to the prefilter, such that the relief flow can be guided out of the containment to the filter systems located outside by partially or completely bypassing the prefilter, if needed.

When venting the containment, the gas flow with a high activity content can thus be guided through the prefilter, where significant filtering of the coarse aerosols of diameters of >1 mm (retention rate preferably >90%) and partial filtering of the quantitatively low proportions of fine aerosols of diameters of <1 mm (retention rate preferably >50%) is carried out for example using metallic deep-bed filter candles or metal-fiber filters. Prefiltering is effected preferably at twice to five times the pressure at the sorbent filter (molecular sieve), in a pressure range of for example 7 to 1 bar.

In order to limit the possible pressure losses at the prefilter, a bypass system that bypasses the prefilter is provided, if needed. The bypass is preferably opened automatically and passively (that means without the use of external energy), by integration of a positive-pressure limiting device, such as a bursting disk or a spring-loaded overflow valve device. The opening mechanism can, for example, be set such that the bypass line is enabled when the pressure loss at the prefilter exceeds a value of >0.5 bar. Owing to the retention, which is brought about by the prefilter when the bypass line is closed, of the predominant amount of aerosols from the initial high-concentration phase of the accident, effective operation of the regenerative heat-exchanger device can be made possible—even without prefilter—in the later accident phase when the bypass line is open.

Advantageously, relevant plant components are dimensioned, and the operating parameters in relief mode selected, such that the pressure loss caused by the prefilter and the regenerative heat exchanger in the high-pressure section is overall <30% of the total available pressure loss before release into the atmosphere in order to ensure a high temperature level for the regenerative heating.

In one advantageous embodiment variant, an additional heating device, in particular an electric heating device or a heating device operated using process steam from another plant, is provided for heating the relief flow in the relief line, which can be set or controlled expediently independently of the operating conditions in the regenerative heat exchanger and in the superheating section. This heating device can be arranged for example downstream of the throttle, for example in the region of the sand-bed or gravel-bed filter and/or at the superheating section. Alternatively or additionally, such heating elements can also be arranged upstream of the throttle in the high-pressure section of the relief line.

Such additional heating of the relief flow can also be effected by way of a second heat accumulator that is previously heated using the relief flow or using separate auxiliary energy sources. These devices can also be used to bridge the startup operation.

The sand bed or gravel bed of the dry filter is preferably used as a heat accumulator in startup operation and is pre-heated by way of standby heating, for example using hot air or surface heating, to >80° C., preferably >100° C.

In another expedient variant, a gas dryer or a dryer/cooler is connected into the relief line between the sand-bed or gravel-bed filter and the superheating section and effects additional drying and dew-point lowering of the relief flow before it enters the superheating section. The cooling capacity of such a dryer/cooler is expediently <25% of the cooling capacity of the regenerative heat exchanger, preferably <10%.

As a result, the dew point is lowered in the interconnected cooling device by way of heat transfer to the environment or else to masses to be heated with corresponding heat capacity in operating conditions with already low containment pressure and low temperatures, in other words with only minor superheating potential, such as is the case during startup. In the subsequent superheating section, heating of the relief flow to nearly high-pressure process temperature then ensures a clear dew-point difference.

In an advantageous embodiment, a suction blower with electric-motor drive or combustion-engine drive is connected into the relief line or is additionally connectable as required, such that, in particular in long-term operation of the pressure-relief system, i.e. once the containment internal pressure that is initially high after an accident event has already largely been reduced, the relief flow is sucked "actively" through the suction blower out of the containment into the relief line having the filter devices therein. In other words, by additionally connecting a suction blower, the filter system can also remain active in long-term after-accident operation or be used in a targeted manner to keep the containment under pressure so as to completely prevent unfiltered outside leaks of the containment.

In shutdown phases, the dry-filter unit (i.e. the sand-bed or gravel-bed filter) is advantageously cooled by way of evaporation of the condensate, which is formed in the regenerative heat exchanger and collects in the condensate collection space, using the accumulated activities and by way of subsequently guiding the steam through the dry-filter unit. The condensate collection space is to this end expediently dimensioned such that dry-filter decay heat outputs of >10 kW can still be maintained for a time period of >8 h by way of steam cooling. In order to intensify the cooling further, it is also possible to integrate a temporarily additionally connectable blower into the lines leading to the dry filter.

Owing to the abovementioned measures, in particular owing to the gas drying and the resulting increase in the dew-point difference, it is now possible to reliably prevent relevant coating of the large internal reaction surface of the sorbent filter with water-containing steam, both in the macro-pore and the micro-pore region of the sorption means, and thus iodine can be particularly effectively retained owing to adsorption on the surfaces and possibly chemisorption on the sorbent material.

The sorbent materials are preferably configured with >50 $m^2/g$ of internal surface and made of inorganic materials. Owing to the now permanently acting superheating process, even the use of sorbent materials with moisture-sensitive (water-soluble) silver nitrate coating or doping becomes possible.

For example, use of silver-impregnated ceramic products such as silica gel makes it possible to permanently achieve highly efficient iodine separation of >99.9%. The molecular sieve can for example also be produced on zeolite basis or with a different, preferably inorganic carrier body and be coated or doped with silver nitrate ($AgNO_3$), which is reacted to silver iodide in case of iodine attack. However, this is favorable only if sufficient superheating of the relief flow in all operational phases can be ensured. Advantageously, the organoiodine can in this case be highly effectively retained in contaminated gases, for example nitrogen-oxide-containing gases and the like.

As a more robust filter material, an artificial zeolite can be used, into which for example by way of ion exchange silver cations and/or heavy-metal cations were introduced into the three-dimensional crystal lattice. Combinations of binder-free zeolites, preferably with an open structure, are also possible. Such a binder-free molecular sieve, for example of the faujasite structure type, is even better in terms of operational reliability, even in strongly superheated steam atmosphere of for example >200° C. and also under short-term water-steam sorption conditions (wet operation). A short-term wet operation thus does not result in destruction of these zeolites, which are doped, for example, with silver. Likewise a minor introduction of lye can be tolerated. Furthermore, short-term gas superheating is achieved by way of moisture adsorption.

It is particularly preferred if the sorbent filter contains a sorbent material on zeolite basis as a mixture of zeolites with non-water-soluble doping, in particular silver doping, and inorganic sorbent materials with water-soluble doping, for example silver nitrate doping. In this case, even in short wet phases, water-steam adsorption is advantageously effected exclusively or at least primarily on the zeolite, such that elution of the water-soluble substances such as silver nitrate can now be reliably prevented. This combination of, for example, both silver doping and silver nitrate doping on a common carrier body proves to be highly efficient and operationally reliable owing to the dual separation mechanism.

Furthermore, suitable sorbent materials that can be used for particularly effective and economical iodine retention are also phosphazene molecules phosphazene zeolites, in particular cyclotriphosphazene zeolites, channel-type crystals, possibly with additional doping.

In a preferred embodiment, the filter chamber can also contain further filter devices and retention devices in addition to the iodine sorbent filter, for example for retaining chlorine-containing and/or nitrous gases and/or oil-containing compounds. To this end, for example further sand-bed filters can be provided, and possibly injection or charging of suitable chemicals.

In addition, in this case, a further short-term gas superheating can be achieved in specific operational phases by way of targeted partial adsorption of water steam on the previously mentioned zeolites (increase of moisture by for example <2 percent by weight by sorption), and thus the desired continuous organoiodine retention can be ensured. This is of particular interest during startup operation (referred to as startup adsorption). In order to limit the temperatures in the case of a moisture attack, it is furthermore also possible to restrict in a targeted fashion the catalytic activity of these sorbents, for example by way of diffusion layers or mixed doping (for example with silver cations and/or heavy-metal cations) and possibly with non-catalytic additives.

As already indicated further above, during startup operation of the pressure-relief system—at operating temperatures which are still comparatively low—at least partial steam adsorption is permitted advantageously in the sorbent filter and the adsorption heat is used to superheat the relief flow and the sorbent filter. This is only meaningful, however, if the sorbent filter is sufficiently insensitive to moisture, that is to say is configured for example on zeolite basis with non-soluble doping.

Furthermore, during startup operation, the relief flow is advantageously dried downstream of the throttle by way of condensation and lowering the dew point in the sand-bed or gravel-bed filter.

With respect to the device, the problem mentioned in the introduction is achieved by way of a pressure-relief system.

Accordingly, the invention provides that a sand-bed or gravel-bed filter is connected into the relief line downstream of the throttle. The relief line has, further downstream, a superheating section which is in thermal interaction with the high-pressure section via heat-exchanger surfaces. The relief line opens into the inlet of the filter chamber directly downstream of the superheating section, and the outlet of the filter chamber is connected to a discharge opening which leads into the atmosphere.

Further advantageous embodiments of the device have been described further above or emerge logically from the description of the corresponding method steps.

The advantages attained by the invention consist in particular of relevant coating of the reaction surfaces with water steam and blocking caused by capillary condensation being reliably prevented by way of a targeted superheating of the relief flow before it enters the iodine sorbent filter in the sorbent both in the macro-pore and in the micro-pore region. Owing to the passive-regenerative configuration of the superheating process with heat recovery from the high-pressure region, the method can also be used in the case of total energy failure ("station blackout") in the nuclear power plant to be relieved. Furthermore, the reaction speeds in the iodine sorption filter are significantly increased on account of the crucially high gas superheating of >10° C., preferably >20° C., for example in the temperature level of >120° C. to 170° C. and more (at high throughput rates and high gas superheating in the initial phase of the relief process). Owing to the very high internal reaction surfaces, which are now available practically without restriction, and improved diffusion, it is possible to achieve passive, highly effective iodine sorption filtering, also for organoiodine compounds, with retention rates of >97%, preferably >99%. Resuspension (subsequent release) of the iodine from the iodine sorbent filter can be largely prevented owing to the chemical binding of the iodine and the permanent heating of the iodine sorbent filter.

In conjunction with further filter devices, in particular a metallic prefilter and a dry filter on sand-bed or gravel-bed basis, it is now possible for the first time to discharge—for ultimate pressure-restriction in the containment—in a filtered state the active gases or steam, which are formed in the containment in accident events, with an organoiodine retention of >99% up to 99.9%. Here, other air-born activities and aerosols are also reliably retained in the filter system, even if the venting operation lasts several days.

Other features which are considered as characteristic for the invention are set forth in the appended claims.

Although the invention is illustrated and described herein as embodied in a method for the pressure relief of a nuclear power plant, pressure-relief system for a nuclear power plant and associated nuclear power plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 5 is a perspective view of detail D shown in FIG. 4.

DETAILED DESCRIPTION OF THE INVENTION

Identical parts or parts with identical action are followed in all figures by the same reference signs.

Figure 1:
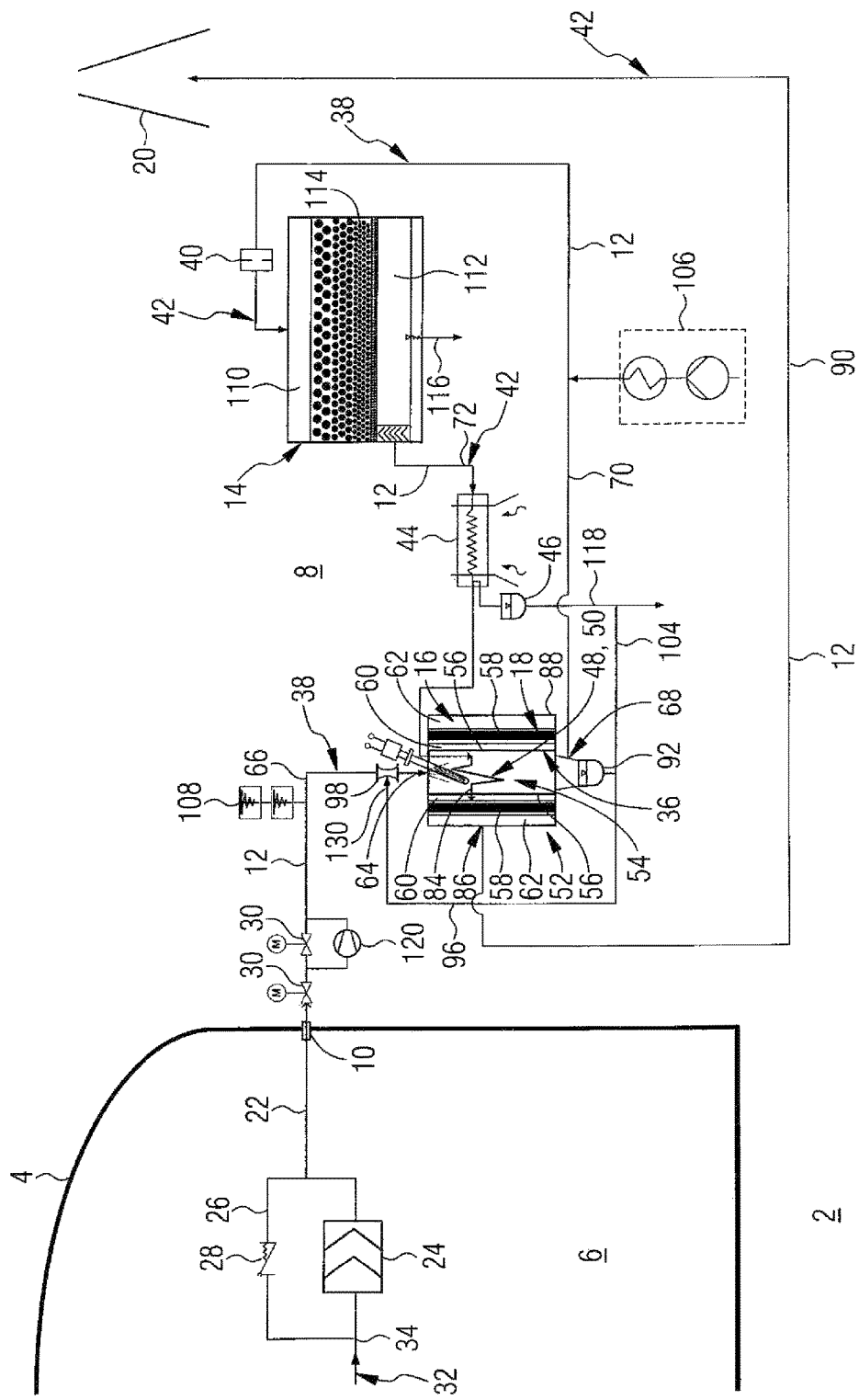
FIG. 1 a block diagram of main components of a pressure-relief system according to the invention for a nuclear power plant.

The nuclear power plant 2 shown in part in FIG. 1 has an external containment 4 with a solid reinforced-concrete shell. The containment 4 encloses an internal space 6. Arranged inside the internal space 6 are the main nuclear components of the nuclear power plant 2, such as the reactor pressure vessel with the reactor core and other nuclear and non-nuclear plant components (not shown). The reinforced-concrete shell of the containment 4 has along its inner side a steel shell. The containment 4 forms a hermetic seal of the internal space 6 with respect to the outside world and, in an unlikely accident event including release of radioactive gases or steam into the internal space 6, causes their retention and inclusion.

The containment 4 is configured to resist even comparatively high internal pressures of for example 3 to 8 bar in the internal space 6, as could occur for example in accident events with massive steam release, and at the same time to remain sealed for relatively long periods of time. Nonetheless, in order to further increase reactor safety, and in order to make it possible again for personnel to safely enter the internal space 6 after an accident, a pressure-relief system 8 is provided, which can be used to filter and clean the gases and steam contained in the internal space 6 and to discharge them, with as little radioactivity as possible, into the environment, such that a controlled pressure reduction in the internal space 6 is made possible. The corresponding process is also referred to as venting.

The pressure-relief system 8 is in the present case configured for particularly effective and, in terms of energy, favorable retention of activity carriers contained in the venting gas, in particular of elemental iodine and iodine-containing organic compounds with low carbon number (what is referred to as organoiodine). To this end, the pressure-relief system 8 contains a relief line 12, which is connected to an outlet 10 or to a passage in the containment 4 and into which, amongst others, a sand-bed or gravel-bed filter 14 and further downstream a sorbent filter 18, specifically an iodine sorbent filter, arranged in a filter chamber 16, are connected one after another. The filtered relief flow is discharged further downstream through a stack 20 or chimney, generally a discharge opening, into the surrounding atmosphere. The flow direction of the relief flow is indicated by arrows in each case.

As can be seen from FIG. 1, the relief line 12 can also contains an inner line section 22, which is located inside the containment 4 and into which a prefilter 24, in particular a metal prefilter, is connected for retaining the coarse aerosols. If it is necessary to bypass the prefilter 24, a bypass line 26 is connected parallel to the prefilter, which bypass line 26 can be opened or closed according to the requirements using a control valve 28.

One or more shut-off valves 30, which are connected into the relief line 12 and are closed during normal operation of the nuclear power plant 2, can be arranged, as shown in FIG. 1, outside the containment 4, alternatively or additionally also in the containment 4, for example directly at the inlet 32 of the line section 22, that is to say upstream of the prefilter 24 and the branch-off location 34 of the bypass line 26. In order to initiate the pressure-relief process in the event of an accident with pressure increase in the internal space 6, the respective shut-off valve 30 is opened, which preferably takes place automatically and without the use of external energy, for example by way of a pressure-dependent trigger device.

In order to set operational conditions at the sorbent filter 18 which are as optimum as possible in terms of the intended filtering, a series of technical measures are provided: during relief operation, the filter chamber 16 with the sorbent filter 18 is first pre-heated via associated heat-exchanger surfaces 36 by way of the comparatively hot relief flow itself, which is still approximately (at least in terms of the order of magnitude) at the pressure level in the internal space 6. Only after the heat has dissipated and been transferred in the high-pressure section 38 of the relief line 12 is the relief flow relaxed in a throttle valve, throttle 40 in short, situated further downstream, to approximately (at least in terms of the order of magnitude) ambient pressure and dried in the process. The part of the relief line 12 that is situated upstream of the throttle 40 forms the high-pressure section 38, the downstream part the low-pressure section 42.

After the expansion drying by way of the throttle 40, the relief flow is guided through the sand-bed or gravel-bed filter 14. As shown in FIG. 1, additional gas dryers 44 with associated condensate separators and condensate collection tanks 46 can be connected into the relief line 12 downstream of the sand-bed or gravel-bed filter 14. Farther downstream, the relief flow in the low-pressure section 42 of the relief line 12 is guided past the high-pressure section 38 such that heat exchange of the gas flow in the high-pressure section 38 to the gas flow in the low-pressure section 42 takes place on corresponding heat-exchanger surfaces 48 of a superheating section 50. The relaxed relief flow is guided through the filter chamber 16 with the sorbent filter 18 only after the resulting superheating.

Thus, the heat energy that is contained in the not yet relaxed relief flow in the high-pressure section 38 is used twice: first, the filter chamber 16 with the sorbent filter 18 which is arranged therein is heated via the heat-exchanger surfaces 36. Secondly, superheating of the relaxed relief flow immediately before it enters the filter chamber 16 takes place via the heat-exchanger surfaces 48. Here, suitable dimensions and configuration of the flow-guiding and heat-conducting components and possibly suitable adjustment of the throttle cross section of the throttle 40 and other operational parameters ensure that the relief flow in the superheating section 50, that is to say immediately before it enters the filter chamber 16, is heated to a temperature that is at least 10° C. above the dew-point temperature in that filter chamber 16, and in full-load operation of the pressure-relief system 8 even at least 20° C. By combining these two measures, condensation of the relief flow in the filter chamber 16, which could adversely affect the efficiency or even permanently destroy the sorbent filter 18, is reliably prevented.

Figure 2:
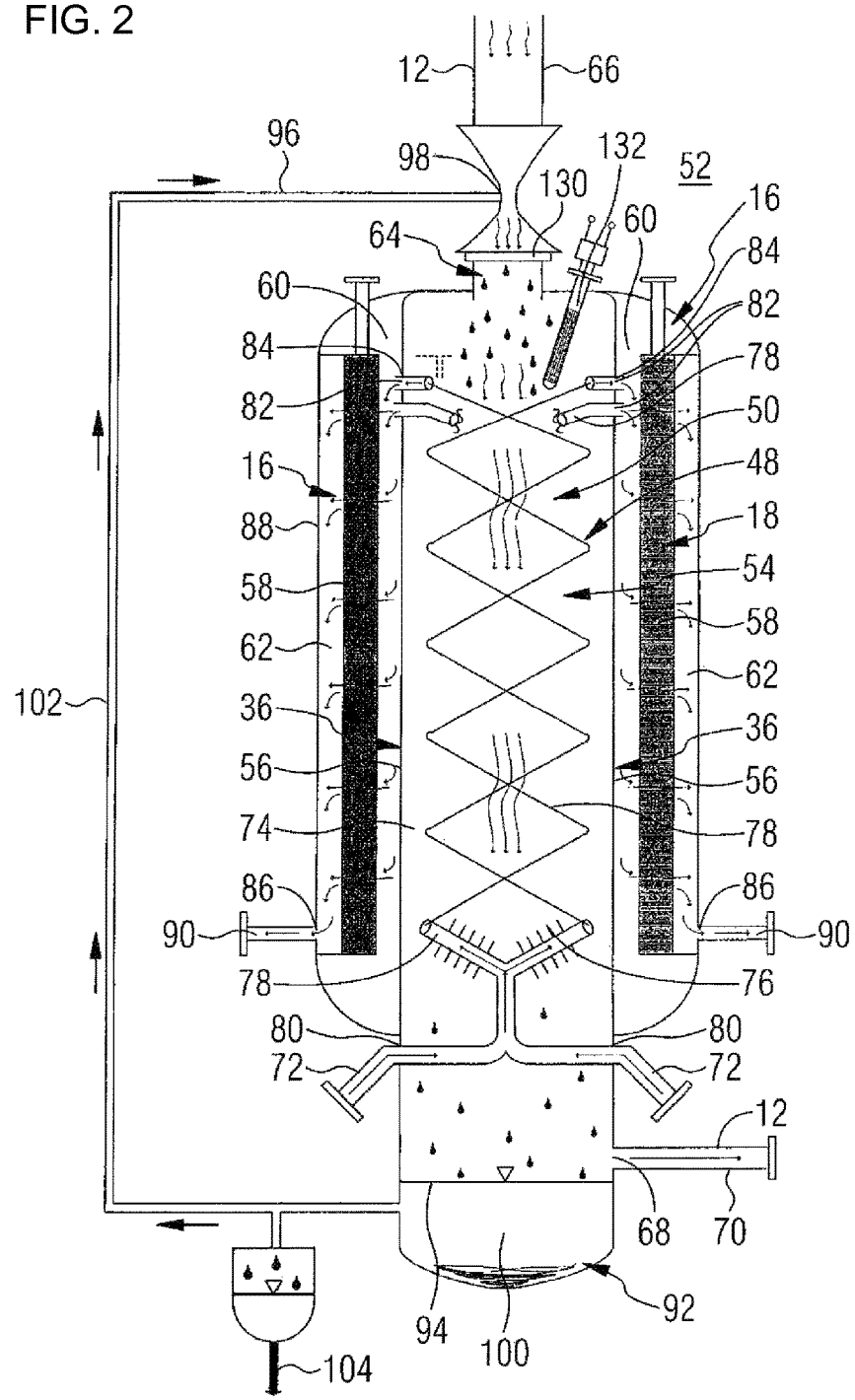
FIG. 2 is a diagrammatic, longitudinal sectional view of a combined regenerative heat exchanger/sorbent filter unit of a pressure-relief system according to FIG. 1 in a longitudinal section.

FIG. 2 shows, in more detail, a concrete embodiment of the heat exchanger/sorbent filter unit 52, which contains the heat-exchanger surfaces 36 and 48. The filter chamber 16 is in the form of an annular chamber which surrounds a central chamber 54, which is cylindrical or cuboid, for example, in the manner of a ring and in particular coaxially. The longitudinal axis of the heat exchanger/sorbent filter unit 52 is vertically oriented. Filter chamber 16 and central chamber 54 are separated from each other by a highly heat-conducting partition 56 in a gas-tight manner. The filter chamber 16 for its part is subdivided into an inner inflow space 60, which is delimited by the partition 56 toward the inside, and an outer outflow space 62 by way of filter elements 58 which are arranged in the manner of a ring inside said filter chamber. Alternatively to the design of an annular chamber, a simple box construction may also be provided, wherein, for example, a cuboid central chamber 54 is adjoined on one side by a cuboid filter chamber 16, which is divided by a straight partition 56. Of course it is also possible for a plurality of filter chambers 16, which are separated from one another and are then connected parallel in terms of flow with respect to the relaxed relief flow in the low-pressure section 42, to be assigned to a central chamber 54.

The central chamber 54 has, in the ceiling region, a central-chamber inlet 64, connected to which is the line section 66, which is coming from the containment 4, of the relief line 12 (see also FIG. 1). In the base region, the central chamber 54 has a central-chamber outlet 68, connected to which is the line section 70, which leads to the throttle 40 and then to the sand-bed or gravel-bed filter 14, of the relief line 12. The line section 72, which leads away from the sand-bed or gravel-bed filter 14 as viewed in the flow direction of the relief flow, of the relief line 12 is connected to a system, arranged in the internal space 74 of the central chamber 54, of heat-exchanger tubes 78 which are connected such that they are parallel in terms of flow and are provided on their outsides with fins 76 (drawn in half-perspective in the end regions are the heat-exchanger tubes 78, in-between they are represented only by a simple line; a second pair of heat-exchanger tubes 78 is shown only in the region of the through-openings 82).

In addition, the relief line 12 in the line section 72 is guided through housing holes 80, which are sealed in a gas-tight manner on their outsides and are attached in the vicinity of the base, into the central chamber 54 and possibly connected to the heat-exchanger tubes 78 via branch-off pieces. Alternatively, plate heat exchangers or other heat-exchanger elements may also be provided. The heat-exchanger tubes 78 are guided in the internal space 74 of the central chamber 54 in a meandering fashion from the bottom to the top up into the ceiling region and connected there to through-openings 82, which lead into the inflow space 60 of the filter chamber 16, penetrate the partition 56 and together form the filter-chamber inlet 84. The filter-chamber outlet 86, in turn, is arranged on the outside of the filter-chamber housing 88, for example in its base region or at another location. The outflow space 62 of the filter chamber 16 is connected to the stack 20 via a line section 90, which is connected to the filter-chamber outlet 86, of the relief line 12.

In this manner, the comparatively hot relief flow, which is coming in the line section 66 from the containment 4 of the nuclear power plant 2 and is under high pressure, is guided into the central chamber 54 via the central-chamber inlet 64 and flows through the latter substantially vertically from top to bottom. Subsequently, the venting gas is guided through the central-chamber outlet 68 and the line section 70 to the throttle 40, dried by expansion and then guided through the sand-bed or gravel-bed filter 14. The relaxed gas flow enters the heat-exchanger tubes 78 via the line section 72 and is guided substantially from the bottom to the top in counter-flow or cross-counterflow with respect to the high-pressure relief flow. While the venting gas flows through the central chamber 54, it comes into thermal contact in the high-pressure section 38 with the highly heat-conducting partition 56, which thus acts as heat-exchanger surface 36 on the filter chamber 16 for heat conduction, and also with the highly heat-conducting heat-exchanger tubes 78, which thus act as heat-exchanger surfaces 48 on the relief flow, which is guided in the heat-exchanger tubes 78 and relaxed by the throttle 40, for heat conduction. The heat-exchanger tubes 78 thus at the same time form the superheating section 50, in which the relaxed relief flow is superheated, as already described above, before it enters, in the superheated state, into the inflow space 60 of the filter chamber 16 via the filter-chamber inlet 84, subsequently flows through the filter elements 58 and finally reaches, in the filtered state, the stack 20 via the outflow space 62, the filter-chamber outlet 86 and the line section 90.

For an improvement of the heat transition, the heat-exchanger tubes 78 can also be appropriately structured on their insides, for example be provided with fins or have other internals that generate turbulence or a swirling flow.

Furthermore, for operational cleaning of the heat-exchanger surfaces 36 and 48, condensate, which forms in the central chamber 54, is (partially) returned and sprayed in in the high-pressure section 38. To this end, the base region of the central chamber 54 is configured as a condensate collection tank 92, also referred to as bottom. The condensate collection tank 92 is dimensioned such that the condensate level 94 during relief operation is below the central-chamber outlet 68. Connected below the condensate level 94 is a condensate return line 96, whose other end opens into a tapering location 98 of the line section 66 in the region of the central-chamber inlet 64. Through it, the condensate 100, which collects in the condensate collection tank 92, is returned—supported by the sucking action of the tapering location 98—in natural circulation at least partially to the central-chamber inlet 64 via the rising section 102 of the condensate return line 96 and injected into the relief flow which is flowing into the central chamber 54 by suitable means, such as a nozzle 130, as a fine spray of water or mist of water. Excess condensate 100 can be removed if required through a condensate drain line 104, which branches off from the condensate return line 96, and for example guided to a condensate reservoir (not shown).

The sand-bed or gravel-bed filter 14 has an inflow region 110 which is connected downstream of the throttle 40 to the line section 70, an outflow region 112 which is connected to the line section 72, and therebetween a sand bed or gravel bed 114 which acts as a filter medium. The sand bed or gravel bed 114 has a plurality of layers, wherein the average grain diameter of the filter sand decreases from the inflow region 110 to the outflow region 112, for example from 2 mm to 0.5 mm. The sand-bed or gravel-bed filter 114 is preferably configured for dry operation without the attack of condensate in the sand bed or gravel bed 114, and is operated in such a manner by way of appropriately setting temperature and moisture in the relief flow. For the alternative case of wet operation, for example during startup operation, a condensate separator 116 (here only indicated schematically) is expediently connected downstream of the sand bed or gravel bed 114 as viewed in the flow direction.

The filter elements 58 of the sorbent filter 18 are preferably made of iodine-sorbing and organoiodine-sorbing materials, for example of binder-free zeolites with open structure, that is to say an open pore system, and with silver doping which is non-soluble during wet operation. In case a moisture attack in the sorbent filter 18 can be reliably ruled out in all operational states of the pressure-relief system 8, for example by way of appropriately setting the superheating output in the superheating section 50, zeolites with a silver nitrate doping or coating can alternatively be considered as filter materials or in any case admixed therewith, whose retention effect on organoiodine has surprisingly proven to be particularly great with sufficiently high dew-point difference of the relief flow.

For reliable control over particular operational states, for example during startup operation, an additional heating device 106, which is operated using an external energy source, is optionally thermally coupled to the relief line 12, here in FIG. 1 for example in the region of the line section 70 between the central-chamber inlet 64 of the heat exchanger/sorbent filter unit 52 and the throttle 40. Furthermore, in each case an electric additional heating 132 can be housed, as shown in FIG. 2, in the central chamber 54 and/or in the filter chamber 16, in particular in its inflow space 60.

In the line section 72 between the sand-bed or gravel-bed filter 14 and the superheating section 50, additional gas dryers 44 can be provided, as already mentioned further above. Condensate which forms in the gas dryer 44 is removed through a condensate drain line 118, which possibly opens into the condensate drain line 104 coming from the heat exchanger/sorbent filter unit 52, as in FIG. 1.

Furthermore, devices for vacuum restriction 108 can be provided in the line section 66 between the outlet 10 of the containment 4 and the central-chamber inlet 64 of the heat exchanger/sorbent filter unit 52. This is used to prevent or quantitatively restrict the formation of a vacuum in the containment 4, for example after venting and subsequent partial condensation of the present steam (for example by additionally connecting a spray system or other cooling system) by way of air-intake suction into the containment 4 as required.

For active discharge of the gas/steam mixture that is present in the containment 4, a suction blower 120 can optionally be connected into the relief line 12, or can be additionally connectable if required, which is supplied with drive energy by an external energy source. It is thus possible to reduce the pressure in the internal space 6 of the containment to (slight) negative pressure with respect to the ambient atmosphere and to keep it there.

Figure 3:
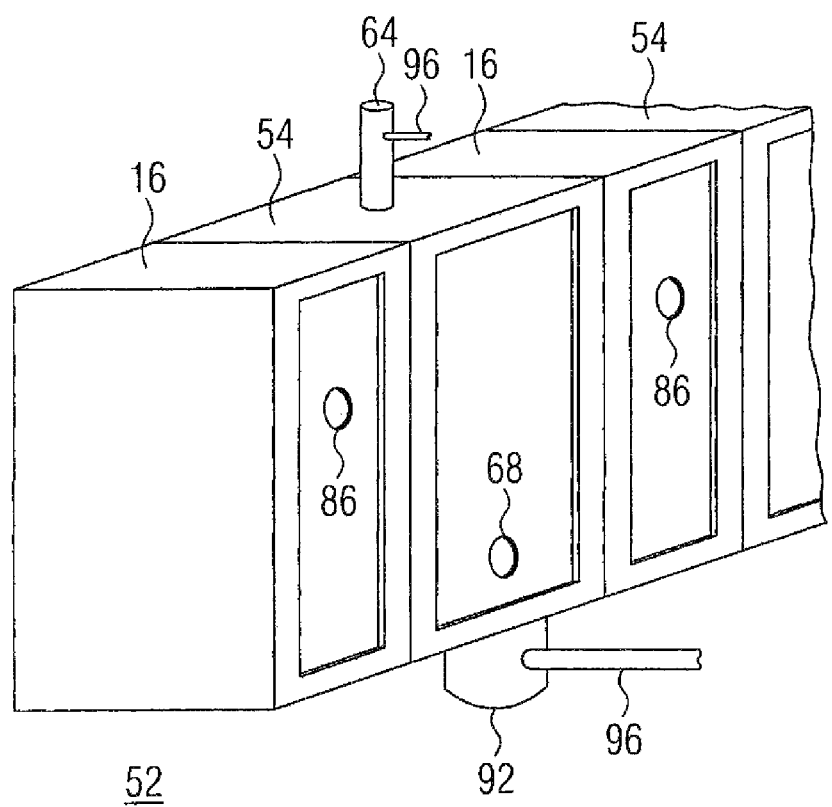
FIG. 3 is a perspective view of a plurality of regenerative heat exchanger/sorbent filter units, placed one next to the other, according to FIG. 2.

Finally it should be noted that the pressure-relief system 8 can have a plurality of strands, of identical or similar design, which are connected in parallel in terms of flow. It is also possible for only individual sections of the relief line 12 to be duplicated by way of connecting components of identical type in parallel. It makes sense in this case to place a plurality of the heat exchanger/sorbent filter units 52 (shown in FIG. 2) such that they directly adjoin one another in the manner of a modular system and are thermally coupled to one another, specifically preferably with alternating arrangement of for example box-shaped central chambers 54 and corresponding filter chambers 16. This can be seen in FIG. 3.

Figure 4:
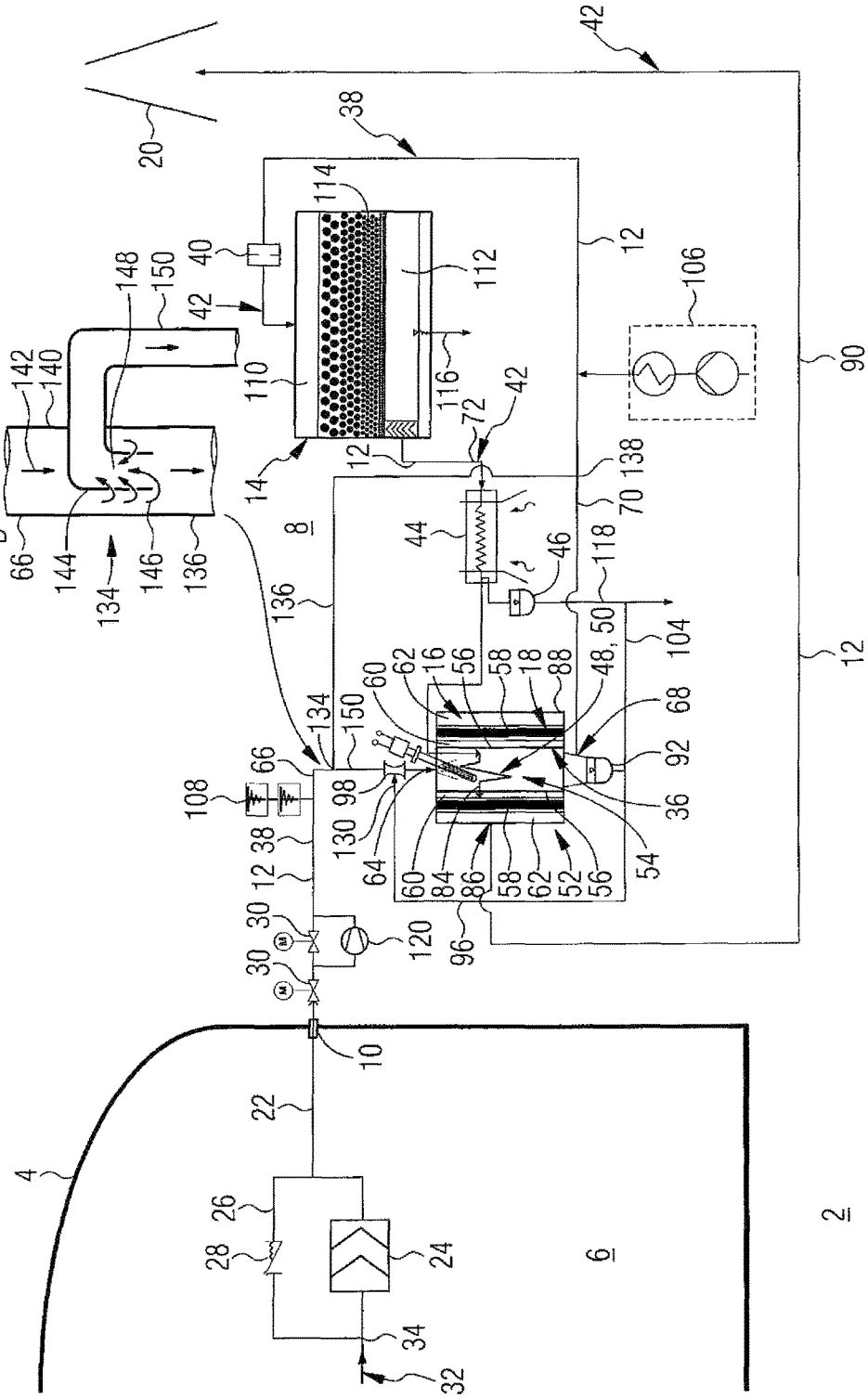
FIG. 4 is block diagram of a variant of the pressure-relief system according to FIG. 1.

The pressure-relief system 8 according to FIG. 4 differs from that in FIG. 1 in that a partial flow of the relief flow in the high-pressure section 38 is guided past the heat exchanger/sorbent filter unit 52, that is to say it does not flow through the central chamber 54 and thus does not contribute to the superheating of the low-pressure relief flow in the low-pressure section 42. To this end, a bypass line 136, which opens again into the relief line 12 at the opening location 138 downstream of the central-chamber outlet 68 and upstream of the throttle 40, is connected to the relief line 12 at the branch-off location 134 upstream of the central-chamber inlet 64, here upstream of the nozzle 130 for condensate injection. For setting the partial-flow ratio, suitable setting and control devices (not shown) can be provided.

In a particularly advantageous embodiment, the branch-off location is configured as shown in the enlarged detail D, which is shown again separately in FIG. 5: the high-pressure relief flow coming from the containment 4 in the line section 66 flows through a pipeline 140 in the main flow direction 142. A partial flow of the relief flow is removed at the branch-off location 134 in a manner such that an at least temporary reversal of direction for the partial flow, counter to the main flow direction 142, is forcibly brought about. This can be done, as shown, by way of a tubular removal connecting piece 144, which leads into the pipeline 140 and has one or more correspondingly arranged and oriented inlet openings 146, for example slit-type or lamella-type inlet openings, for the partial flow to be removed and a short counterflow section 148, in which the removed partial flow must flow counter to the main flow direction 142. The partial flow thus removed (referred to here as heating flow) is fed, via the line section 150, to the central chamber 54 of the heat exchanger/sorbent filter unit 52, while the second partial flow which continues in the main flow direction 142 (here referred to as main flow) is guided past the heat exchanger/sorbent filter unit 52 via the bypass line 136, that is to say bypasses the heat exchanger/sorbent filter unit 52 without dissipating heat.

Owing to the forced reversal in direction of the heating flow as compared to the main flow, particles entrained in the relief flow are effectively separated from the heating flow according to the principle of inertia separation. The heating flow, which is guided through the downstream heat exchanger/sorbent filter unit 52, is thus largely particle-free, with the result that the heat transfer at the heat-exchanger surfaces 36, 48 which are situated there is only slightly adversely affected even without spraying in condensate. The particles which are also guided in the bypass line 136 are largely filtered out of the relief flow further downstream in the sand-bed or gravel-bed filter 114, with the result that there is no noticeable adverse effect even in the low-pressure region on the heat-exchanger surfaces 48, situated inside in the heat-exchanger tubes 78, of the superheating section 50.

The invention claimed is:

1. A method for pressure relief of a nuclear power plant having a containment for enclosing activity carriers and an outlet for a relief flow, which comprises the steps of:
   guiding the relief flow out of the containment into an atmosphere via a relief line provided with a filter system, the filter system having a filter chamber with a filter-chamber inlet, a filter-chamber outlet and a sorbent filter disposed therebetween;
   guiding the relief flow through a high-pressure section of the relief line where the relief flow moves adjacent too but not through the filter chamber, with the filter chamber being heated by way of heat transfer from the relief flow, and the relief flow being expanded at an end of the high-pressure section at a throttle and dried resulting in a low-pressure relief flow in comparison to the relief flow in the high-pressure section;
   guiding the low-pressure relief flow through a bed filter selected from the group consisting of a sand-bed filter and a gravel-bed filter;
   guiding the low-pressure relief flow through a superheating section surrounded by the high-pressure section of the relief line, the superheating section being in thermal interaction with the relief flow in the high-pressure section via heat-exchanger elements resulting in heating of the low-pressure relief flow by way of heat transfer from the high-pressure section;
   guiding the low-pressure relief flow directly thereafter through the filter chamber having the sorbent filter; and
   discharging the low-pressure relief flow into the atmosphere.

2. The method according to claim 1, which further comprises heating the low-pressure relief flow in the superheating section to a temperature which is at least 10° C. above a dew-point temperature present there.

3. The method according to claim 1, which further comprises guiding the relief flow in the high-pressure section through a central chamber which is surrounded by the filter chamber or adjoins it, and guiding the low-pressure relief flow in the superheating section through the heat-exchanger elements which are disposed in the central chamber.

4. The method according to claim 3, which further comprises guiding the low-pressure relief flow in the superheating section in one of a counter-flow or a cross-counter-flow with respect to the relief flow in the high-pressure section.

5. The method according to claim 3, wherein the central chamber has a central-chamber inlet, through which the relief flow in the high-pressure section is guided into the central chamber, and condensate which forms in the central chamber is collected in a condensate collection tank, which is connected to the central chamber, and at least partially returned to the central-chamber inlet and injected as a fine spray of water or mist of water.

6. The method according to claim 1, which further comprises setting a flow speed of the relief flow in the high-pressure section within a range of 10 m/s to 50 m/s.

7. The method according to claim 1, which further comprises setting a flow speed of the low-pressure relief flow in the superheating section within a range of 10 m/s to 70 m/s.

8. The method according to claim 1, which further comprises setting a free flow cross section of the throttle such that a pressure in the high-pressure section is twice to five times as high as a pressure in the superheating section.

9. The method according to claim 1, which further comprises guiding the low-pressure relief flow over the sorbent filter with non-water-soluble silver doping.

10. The method according to claim 1, which further comprises heating the low-pressure relief flow in the superheating section to a temperature range of 20° C. to 50° C. above a dew-point temperature present there.

11. The method according to claim 3, which further comprises forming the heat exchanger elements as heat-exchanger tubes disposed in the central chamber.

12. The method according to claim 1, which further comprises in full-load operation, setting a flow speed of the relief flow in the high-pressure section within a range of 10 m/s to 50 m/s.

13. The method according to claim 1, which further comprises in full-load operation, setting a flow speed of the low-pressure relief flow in the superheating section within a range of 10 m/s to 70 m/s.

* * * * *